US012568323B2

(12) United States Patent
Wei et al.

(10) Patent No.: US 12,568,323 B2
(45) Date of Patent: Mar. 3, 2026

(54) DCN PACKET PROCESSING METHOD, NETWORK DEVICE, AND SYSTEM

(71) Applicant: HUAWEI TECHNOLOGIES CO., LTD., Shenzhen (CN)

(72) Inventors: Jichuan Wei, Chengdu (CN); Wenzhuo Zhang, Chengdu (CN); Jinliang Ge, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 18/485,741

(22) Filed: Oct. 12, 2023

(65) Prior Publication Data

US 2024/0040288 A1 Feb. 1, 2024

Related U.S. Application Data

(63) Continuation of application No. PCT/CN2022/072099, filed on Jan. 14, 2022.

(30) Foreign Application Priority Data

Apr. 14, 2021 (CN) .......................... 202110402622.7

(51) Int. Cl.
*H04Q 11/00* (2006.01)
(52) U.S. Cl.
CPC . *H04Q 11/0062* (2013.01); *H04Q 2011/0083* (2013.01)
(58) Field of Classification Search
None
See application file for complete search history.

(56) References Cited

U.S. PATENT DOCUMENTS

2004/0151171 A1* 8/2004 Lee ...................... H04J 14/0209
370/380
2012/0314703 A1* 12/2012 Testa ...................... H04L 12/42
370/389

(Continued)

FOREIGN PATENT DOCUMENTS

CN 101854339 A 10/2010
CN 104092595 A 10/2014

(Continued)

OTHER PUBLICATIONS

Lirong Bai; Optical service unit (OSU)-based next generation optical transport network (NG OTN) technology and verification; MATEC Web Conf., 336 (2021) 04014; DOI: https://doi.org/10.1051/matecconf/202133604014; published online Feb. 15, 2021. (Year: 2021).*

(Continued)

*Primary Examiner* — Nathan M Cors
(74) *Attorney, Agent, or Firm* — Fish & Richardson P.C.

(57) ABSTRACT
This application provides example packet processing methods, network devices, and systems. One example method includes obtaining, by a first network device, a first data communication network (DCN) packet by using a hardware processor, where the first DCN packet is carried in a payload area of a first data frame, and the first DCN packet includes a target device identifier. The first network device determines, based on the target device identifier, by using the hardware processor, whether the first DCN packet is a direct packet. In response to determining that the first DCN packet is a direct packet, the first network device sends the first DCN packet to a second network device, where the second network device corresponds to the target device identifier.

20 Claims, 9 Drawing Sheets

(56) References Cited

U.S. PATENT DOCUMENTS

| | | | |
|---|---|---|---|
| 2014/0093239 A1 | 4/2014 | Griswold et al. | |
| 2017/0272369 A1* | 9/2017 | Youn ................. | H04Q 11/0005 |

FOREIGN PATENT DOCUMENTS

| | | |
|---|---|---|
| CN | 105589506 A | 5/2016 |
| CN | 110875862 A | 3/2020 |
| WO | 2018001242 A1 | 1/2018 |
| WO | 2021063197 A1 | 4/2021 |

OTHER PUBLICATIONS

International Search Report and Written Opinion in International Appln. No. PCT/CN2022/072099, mailed on Mar. 10, 2022, 20 pages (with English translation).
Extended European Search Report in European Appln No. 22787230. 6, dated Jul. 2, 2024, 9 pages.

\* cited by examiner

FAS: Frame alignment signal    OTUk: Optical transport unit k    OTUk OH

OH: Overhead                   ODUk: Optical data unit k

OPUk: Optical payload unit k    GCC: General communication channel

FAS: Frame alignment signal          OTUk: Optical transport unit k          OSUflex: Flexible optical service unit OPUK: Optical payload unit k          ODUk: Optical data unit k          PB: Payload block TPN: Tributary port number          OAM: Operation, administration and maintenance CRC: Cyclic redundancy check　TPN: Tributary port number　RES: Reserved overhead Reserved: Reserved field　　　CV: Connectivity verification　TCM: Tandem connection monitor VER: Version number　　　　　FT: Frame type　　　　　　　PM: Path monitoring

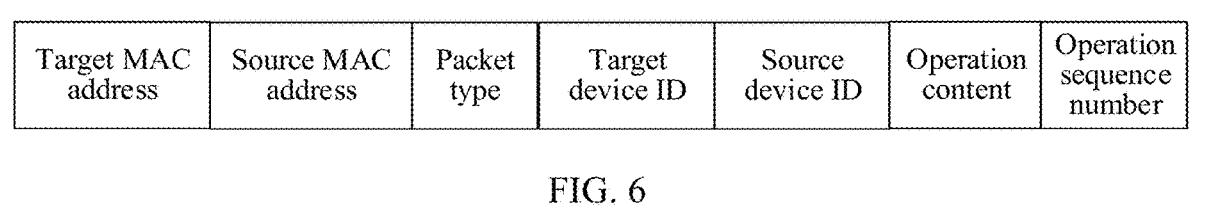

| Target MAC address | Source MAC address | Packet type | Target device ID | Source device ID | Operation content | Operation sequence number |
|---|---|---|---|---|---|---|

FIG. 6

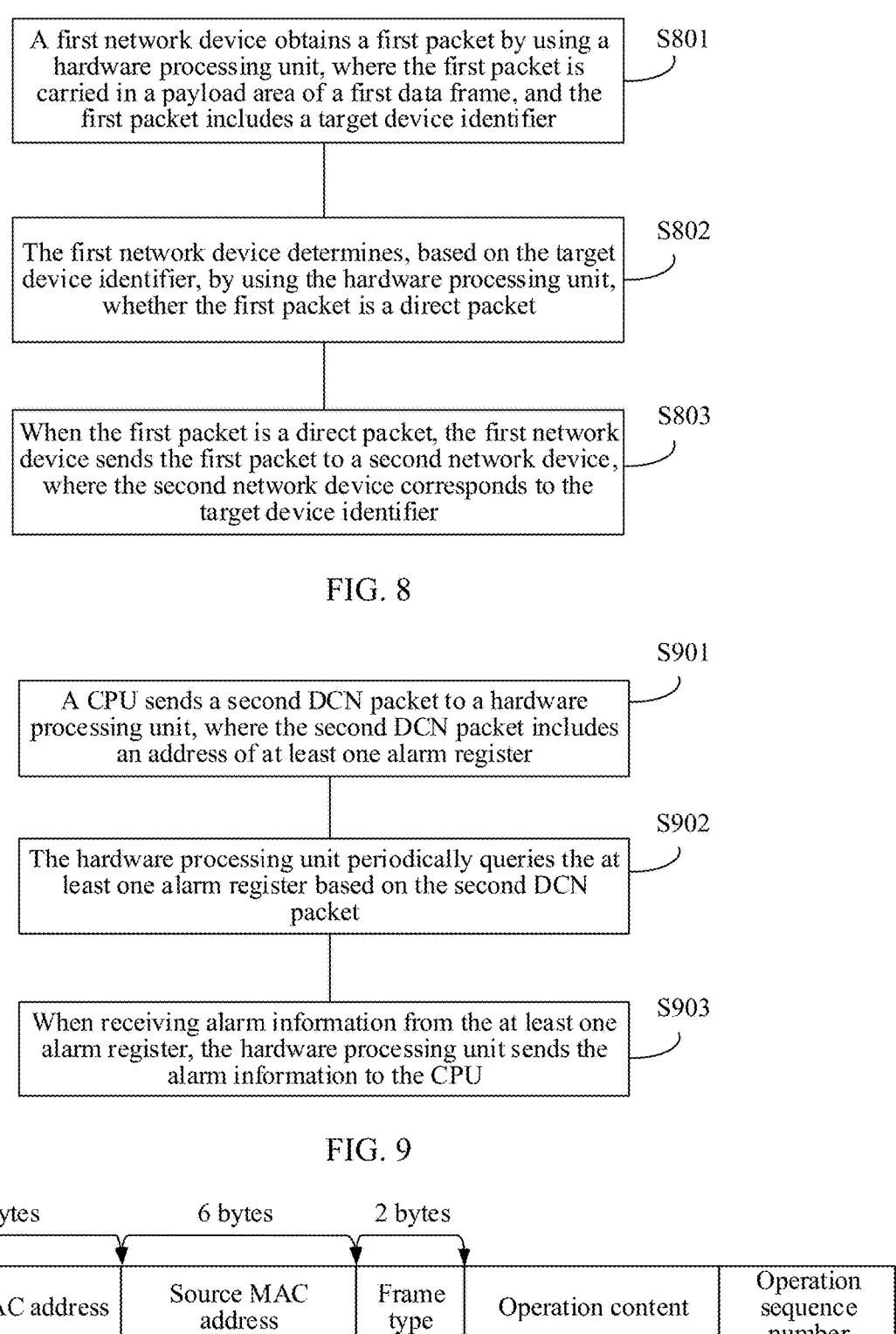

A first network device obtains a first packet by using a hardware processing unit, where the first packet is carried in a payload area of a first data frame, and the first packet includes a target device identifier     S801

The first network device determines, based on the target device identifier, by using the hardware processing unit, whether the first packet is a direct packet     S802

When the first packet is a direct packet, the first network device sends the first packet to a second network device, where the second network device corresponds to the target device identifier     S803

FIG. 8

A CPU sends a second DCN packet to a hardware processing unit, where the second DCN packet includes an address of at least one alarm register     S901

The hardware processing unit periodically queries the at least one alarm register based on the second DCN packet     S902

When receiving alarm information from the at least one alarm register, the hardware processing unit sends the alarm information to the CPU     S903

FIG. 9

| 6 bytes | 6 bytes | 2 bytes | | |
|---|---|---|---|---|
| Target MAC address | Source MAC address | Frame type | Operation content | Operation sequence number |

FIG. 10

DCN PACKET PROCESSING METHOD, NETWORK DEVICE, AND SYSTEM

CROSS-REFERENCE TO RELATED APPLICATIONS

This application is a continuation of International Application No. PCT/CN2022/072099, filed on Jan. 14, 2022, which claims priority to Chinese Patent Application No. 202110402622.7, filed on Apr. 14, 2021. The disclosures of the aforementioned applications are hereby incorporated by reference in their entireties.

TECHNICAL FIELD

This application relates to the field of communication technologies, and in particular, to a packet processing method, network device, and system.

BACKGROUND

In a data communication network (DCN), an optical transport network (OTN) becomes a mainstream technology used in a transport network due to features such as high bandwidth, large capacity, high reliability, and low latency, and is widely applied to backbone, metro, core, and aggregation networks. An OTN frame is used to carry various service data and provide various management and monitoring functions. Currently, a mainstream of network element (NE) management and control is centralized management and control. Currently, emergence of requirements such as ultra-large network management, large-scale service provisioning, batch upgrade, batch inspection, and large-scale intelligent rerouting imposes increasingly high requirements on a DCN bandwidth. Currently, the OTN frame transfers control information through an overhead field of a general communication channel (GCC), and a bandwidth occupied by the control information is related to a rate level of an optical data unit-k (ODUk). A bandwidth of a network control channel cannot meet a current network scale and service requirement.

In the DCN, each network element needs to receive a large quantity of DCN packets. A small quantity of packets need to be processed locally and a large quantity of packets need to pass through. Currently, after receiving these packets, the network element sends the packets to a central processing unit (CPU) in the network element by using hardware, and then the packets are delivered to pass through after being identified and processed by the CPU. Consequently, a data packet processing delay is long, processing efficiency is low, and CPU reading resources are greatly consumed. This leads to degradation of CPU processing performance.

SUMMARY

According to a first aspect, an embodiment of this application provides a packet processing method. The method includes: A first network device obtains a first DCN packet by using a hardware processing unit, where the first DCN packet is carried in a payload area of a first data frame, and the first DCN packet includes a target device identifier; the first network device determines, based on the target device identifier, by using the hardware processing unit, whether the first DCN packet is a direct packet; and when the first DCN packet is a direct packet, the first network device sends the first DCN packet to a second network device, where the second network device corresponds to the target device identifier.

The foregoing packet processing method may be applied to packet transmission between network elements. After receiving a large quantity of DCN packets, a single network element determines, by using the hardware processing unit, whether the DCN packets are direct packets, quickly forwards a direct packet that does not need to be processed by the current network element along with a service, and reports only an indirect packet that needs to be processed by the current network element to a CPU. This can greatly reduce read power consumption of the CPU, thereby improving processing performance of the CPU. In addition, the DCN packet between the network elements is carried in a payload area of a data frame, which expands a transmission bandwidth of the DCN packet and resolves a problem of insufficient bandwidth of a current control channel.

With reference to the first aspect, in a possible implementation, the target device identifier includes a target device MAC address or a target device ID, and that the first network device determines, based on the target device identifier, by using the hardware processing unit, whether the first DCN packet is a direct packet includes: The hardware processing unit of the first network device determines, based on the target device MAC address or the target device ID, whether the first DCN packet is a direct packet.

The hardware processing unit determines, by identifying the target device identifier carried in the first DCN packet, whether the first DCN packet is a packet that needs to be processed by the current network element. When the first DCN packet is a direct packet, the first DCN packet is directly forwarded, and does not need to be first reported to the CPU for processing, and then delivered to pass through. In this implementation, a packet transmission delay can be reduced, and the read power consumption of the CPU can be reduced.

With reference to the first aspect, in a possible implementation, the first DCN packet further includes at least one of the following: a source device MAC address, a control packet identifier, a source device ID, operation content, and an operation sequence number. The source device MAC address indicates a source address of the first DCN packet. The control packet identifier indicates that the first DCN packet is a control type packet, for example, an ETH TYPE or a frame type (FT). The source device ID indicates a source device ID of the first DCN packet. The operation content is an operation that needs to be performed by the target device. When a source device needs to send a plurality of times of continuous operation content to the target device, the operation sequence number is used to identify a sequence of the plurality of times of continuous operation content.

For example, the first DCN packet is used to perform basic operation, maintenance, and management on the network element, for example, configuration delivery, performance alarm, software upgrade, log query, database deletion, and file deletion. The operation content is an operation command symbol corresponding to the foregoing control and management packet. For example, the first DCN packet is used for a packet sending and receiving test, and the operation content is a command symbol for confirming, to the second network device, whether a port of the second network device can receive a command symbol of the packet.

With reference to the first aspect, in another possible implementation, the first data frame is an optical transport unit OTU frame. A payload area of the OTU frame includes a plurality of optical service unit OSU (OSU) frames, and the first DCN packet is carried in at least one of the OSU frames. It should be noted that, each OSU frame is an independent information element, which changes an original data encapsulation size and can be directly mapped to an ODUk pipe. The first DCN packet is carried by the OSU frame. This breaks through a bandwidth limitation that control information can be carried only by a specific overhead field, thereby resolving a problem of insufficient control bandwidth.

With reference to the first aspect, in a possible implementation, a length of the OSU frame is 192 bytes, 240 bytes, 128 bytes, or 64 bytes.

With reference to the first aspect, in a possible implementation, that the hardware processing unit determines whether the first DCN packet is a direct packet further includes: When the first DCN packet is an indirect packet, the hardware processing unit sends the first DCN packet to a central processing unit CPU of the first network device.

For example, the hardware processing unit determines, by identifying that the target device identifier carried in the first DCN packet corresponds to the first network device, that the first DCN packet is the packet that needs to be processed by the current network element, and then reports the first DCN packet to the CPU for processing. In this implementation, the CPU only needs to process a packet belonging to the network element. This can reduce the packet transmission delay, reduce the read power consumption of the CPU, and improve the processing performance of the CPU.

With reference to the first aspect, in a possible implementation, the method further includes: The CPU sends a second DCN packet to the hardware processing unit, where the second DCN packet includes an address of at least one alarm register; the hardware processing unit periodically queries the at least one alarm register based on the second DCN packet; and when receiving alarm information from the at least one alarm register, the hardware processing unit sends the alarm information to the CPU. This implementation is mainly applied in the network element. The CPU controls the hardware processing unit by using the second DCN packet, so that the hardware processing unit periodically reads the alarm register. In this way, an operation of querying an alarm is delivered to a hardware layer for completion, and more resources of the CPU can be saved.

With reference to the first aspect, in a possible implementation, that the first network device sends the first DCN packet to a second network device includes: The first network device maps the first DCN packet to a payload area of a second data frame, where the second data frame is an OTU frame, a payload area of the OTU frame includes a plurality of optical service unit frames, and the first DCN packet is carried in at least one of the optical service unit frames; and the first network device sends the second data frame to the second network device. The first DCN packet is carried by the OSU frame. This breaks through the bandwidth limitation that the control information can be carried only by the specific overhead field, thereby resolving the problem of insufficient control bandwidth.

With reference to the first aspect, in a possible implementation, the hardware processing unit is a field programmable gate array (FPGA) chip.

According to a second aspect, this application provides a packet processing method. The method includes: A control device generates a first DCN packet, where the first DCN packet includes a target device identifier, and the target device identifier corresponds to a second network device;

and the control device maps the first DCN packet to a payload area of a first data frame, and sends the first data frame to a first network device, so that the first network device forwards the first DCN packet to the second network device based on the target device identifier.

The control device includes a DCN packet in a payload area of a data frame, which expands a transmission bandwidth of the DCN packet and resolves a problem of insufficient bandwidth of a current control channel.

With reference to the second aspect, in a possible implementation, the first data frame is an optical transport unit OTU frame, a payload area of the OTU frame includes a plurality of optical service unit OSU frames, and the first DCN packet is carried in at least one of the OSU frames. The first DCN packet is carried by the OSU frame. This breaks through a bandwidth limitation that control information can be carried only by a specific overhead field, thereby resolving a problem of insufficient control bandwidth.

With reference to the second aspect, in a possible implementation, the first DCN packet further includes at least one of the following: a source device MAC address, a control packet identifier, a source device ID, operation content, and an operation sequence number. The source device MAC address indicates a source address of the first DCN packet. The control packet identifier indicates that the first DCN packet is a control type packet, for example, an ETH TYPE or a frame type (FT). The source device ID indicates a source device ID of the first DCN packet. The operation content is an operation that needs to be performed by the target device. When a source device needs to send a plurality of times of continuous operation content to the target device, the operation sequence number is used to identify a sequence of the plurality of times of continuous operation content.

For another implementation according to the second aspect, refer to the first aspect and the specific implementations according to the first aspect. Details are not described herein again.

According to a third aspect, an embodiment of this application provides a packet processing network device. The network device includes: an obtaining unit, configured to obtain a first DCN packet, where the first DCN packet is carried in a payload area of a first data frame, and the first DCN packet includes a target device identifier; a determining unit, configured to determine, based on the target device identifier, whether the first DCN packet is a direct packet; and a sending unit, configured to: when the first DCN packet is a direct packet, send the first DCN packet to a second network device, where the second network device corresponds to the target device identifier.

It should be noted that, the obtaining unit, the determining unit, and the sending unit are all located on a hardware processing chip. After obtaining a large quantity of DCN packets by using the obtaining unit, the network device determines, by using the determining unit, whether the DCN packets are direct packets, quickly forwards a direct packet that does not need to be processed by a current network element along with a service, and reports only an indirect packet that needs to be processed by the current network device to a CPU. This can greatly reduce read power consumption of the CPU, thereby improving processing performance of the CPU. In addition, the DCN packet between network elements is carried in a payload area of a data frame, which expands a transmission bandwidth of the DCN packet and resolves a problem of insufficient bandwidth of a current control channel.

With reference to the third aspect, in a possible implementation, the target device identifier includes a target device MAC address or a target device ID, and the determining unit is specifically configured to: determine, based on the target device MAC address or the target device ID, whether the first DCN packet is a direct packet.

With reference to the third aspect, in a possible implementation, the first data frame is an optical transport unit OTU frame, a payload area of the OTU frame includes a plurality of optical service unit OSU frames, and the first DCN packet is carried in at least one of the OSU frames.

With reference to the third aspect, in a possible implementation, the network device further includes a central processing unit CPU, and the sending unit is further configured to: when the first DCN packet is an indirect packet, send the first DCN packet to the CPU of the network device.

For example, the determining unit determines, by identifying that the target device identifier carried in the first DCN packet corresponds to the first network device, that the first DCN packet is the packet that needs to be processed by the current network element, and then reports the first DCN packet to the CPU for processing. In this implementation, the CPU only needs to process a packet belonging to the network element. This can reduce a packet transmission delay, reduce the read power consumption of the CPU, and improve the processing performance of the CPU.

With reference to the third aspect, in a possible implementation, the network device further includes an alarm collection unit and an alarm register, and the CPU is further configured to: send a second DCN packet to the alarm collection unit, where the second DCN packet includes an address of the alarm register. The alarm collection unit is configured to periodically query the alarm register based on the second DCN packet. The alarm collection unit is further configured to: when receiving alarm information sent by the alarm register, send the alarm information to the CPU. This implementation is mainly applied in the network element. The CPU controls the alarm collection unit by using the second DCN packet, so that the alarm collection unit periodically reads the alarm register. In this way, an operation of querying an alarm is delivered to a hardware layer for completion, and more resources of the CPU can be saved.

With reference to the third aspect, in a possible implementation, the sending unit is further configured to: map the first DCN packet to a payload area of a second data frame, where the second data frame is an OTU frame, a payload area of the OTU frame includes a plurality of optical service unit OSU frames, and the first DCN packet is carried in at least one of the OSU frames. The sending unit sends the second data frame to the second network device.

With reference to the third aspect, in a possible implementation, the obtaining unit, the determining unit, and the sending unit are integrated on a field programmable gate array FPGA chip.

For another implementation according to the third aspect, refer to the first aspect and the specific implementations according to the first aspect. Details are not described herein again.

According to a fourth aspect, an embodiment of this application provides a network device. The network device includes: a generating unit, configured to generate a first DCN packet, where the first DCN packet is used to control a second network device, the first DCN packet includes a target device identifier, and the target device identifier corresponds to the second network device; and a sending unit, configured to map the first DCN packet to a payload area of a first data frame, and send the first data frame to a first network device, to enable the first network device to forward the first DCN packet to the second network device based on the target device identifier.

It should be noted that, the network device in this aspect may be understood as a network management device.

In a possible implementation, the foregoing network management device may be deployed on a physical device. The physical device may include one or more processors and one or more memories. The memory may store instructions, and when the instructions are loaded and executed by the processor, a function performed by the foregoing network management device may be implemented. Certainly, the physical device may further include an input/output interface, for example, a wired or wireless network interface, to communicate with outside.

In another possible implementation, the network management device may alternatively be deployed on a plurality of physical devices in a distributed manner. The plurality of physical devices may form a device cluster. The device cluster may include one or more processors and one or more memories. The memory may store instructions, and when the instructions are loaded and executed by the processor, a function performed by the foregoing network management device may be implemented.

According to a fifth aspect, an embodiment of this application provides a packet processing apparatus, including a processor. The processor is coupled to a memory, the memory is configured to store a computer program or instructions, and the processor is configured to execute the computer program or the instructions in the memory, so that the method in any one of the first aspect or the possible implementations of the first aspect is performed.

According to a sixth aspect, an embodiment of this application provides a commissioning system, including the network device according to any one of the third aspect or the possible implementations of the third aspect and the control device according to the fifth aspect.

According to a seventh aspect, an embodiment of this application provides a computer-readable storage medium. The computer-readable storage medium stores a computer program or instructions, and the computer program or the instructions are used to implement the method according to any one of the first aspect, the second aspect, or the possible implementations of the first aspect and the second aspect.

According to an eighth aspect, an embodiment of this application provides a computer program product. The computer program product includes a computer program or instructions. When the computer program or the instructions are executed by a computer, the method according to any one of the first aspect, the second aspect, or the possible implementations of the first aspect and the second aspect can be implemented by an apparatus.

According to the foregoing packet processing method, network device, and the like provided in embodiments of this application, after receiving a large quantity of DCN packets, a single network element determines, by using a hardware processing unit, whether the DCN packets are direct packets, quickly forwards a direct packet that does not need to be processed by the current network element along with a service, and reports only an indirect packet that needs to be processed by the current network element to a CPU. This can greatly reduce read power consumption of the CPU, thereby improving processing performance of the CPU. In addition, the DCN packet between network elements is carried in a payload area of a data frame, which expands a transmission bandwidth of the DCN packet and resolves a problem of insufficient bandwidth of a current control channel.

BRIEF DESCRIPTION OF DRAWINGS

FIG. 6 is a schematic diagram of an encapsulation format of a DCN packet according to an embodiment of this application;

FIG. 8 is a flowchart of another packet processing method according to an embodiment of this application;

FIG. 9 is a flowchart of an alarm information collection method within a network element according to an embodiment of this application;

FIG. 10 is a schematic diagram of a format of a packet transmitted within a network element according to an embodiment of this application;

DESCRIPTION OF EMBODIMENTS

Figure 1:
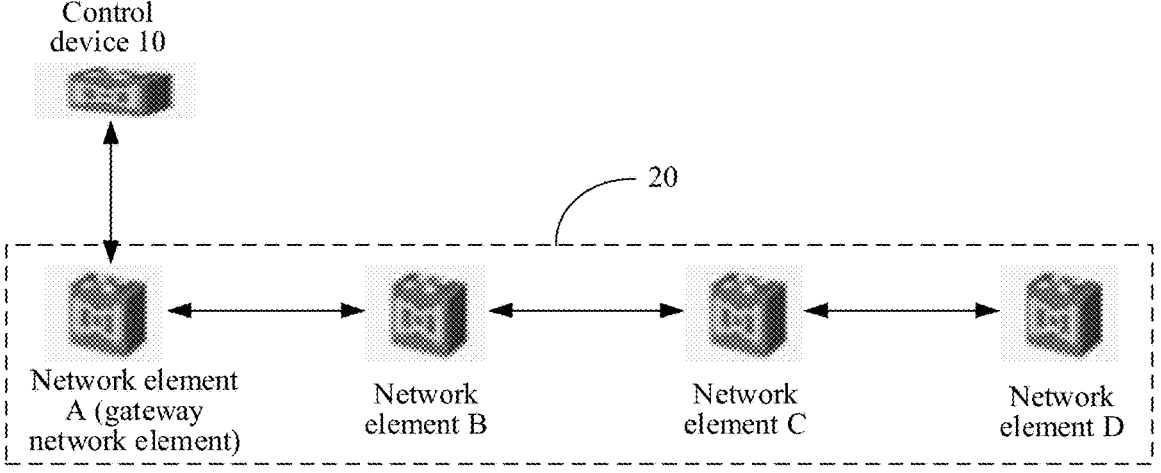
FIG. 1 is a schematic diagram of an architecture of a system according to an embodiment of this application.

The following describes technical solutions in embodiments of this application with reference to accompanying drawings in embodiments of this application.

The technical solutions in embodiments of this application may be applied to various optical communication systems, or may be applied to any communication system in which control information needs to be transmitted by a packet.

Terms used in the following embodiments are merely intended to describe specific embodiments, and are not intended to limit this application. As used in the specification and the appended claims of this application, the singular expressions "one", "one", "the above", "the" and "this" are intended to also include such expressions as "one or more", unless the context clearly indicates to the contrary. It should be further understood that in the following embodiments of this application, "at least one" and "one or more" mean one, two, or more.

Reference to "one embodiment" described in this specification or the like means that one or more embodiments of this application include a particular feature, structure, or characteristic described in combination with the embodiment. Therefore, statements "in one embodiment", "in some other embodiments", "in other embodiments" and the like that appear at different places in this specification do not necessarily mean referring to a same embodiment. Instead, the statements mean "one or more but not all embodiments", unless otherwise especially emphasized in another manner. Terms "include", "comprise", "have", and variations thereof all mean "including, but not limited to", unless otherwise particularly specified.

To facilitate understanding of a method and device provided in embodiments of this application, the following first describes some terms.

1. DCN

A DCN is a data communication network, and provides a communication channel for a management network element. The DCN in this application is a network that provides a path for communication of operation, administration and maintenance (OAM) information inside and between a transport plane, a control plane, and a management plane. The DCN supports layer 1 (physical layer), layer 2 (data link layer), and layer 3 (network layer) functions in a network layer 7 protocol stack. The DCN is mainly used to carry management information and a distributed signaling message.

In summary, the DCN in this application is a communication network used to transmit management and control information in a network. In addition, in this application, management and control information transmitted by the DCN is collectively referred to as a DCN packet.

It should be noted that, a current DCN may have different physical bearer networks, for example, an optical transport network OTN or Ethernet. This is not limited in this application. This application is described by using an example in which the DCN packet is transmitted through an OTN channel. However, this does not constitute a limitation on the application scope of this application.

2. Network Element

A network element is a minimum unit that can be monitored and managed in network management. Usually, the network element includes one or more disks or subracks and can independently implement a specific transmission function. The network element can be simply regarded as an object that needs to be managed in a network. The network element may be implemented by software, for example, a virtual machine, a container, or an application; or may be implemented by hardware, for example, a server, a base station, a switch, a router, a relay, a mobile terminal, a personal computer, a disk, or a solid-state drive; or may be implemented by combining software and hardware. A specific form of the network element is not limited in this application. For example, the network element may be a distributed network element.

It should be noted that, in some embodiments of this application, the network element may also be referred to as a network device or a device, and the network element and the network device or the device have equivalent meaning and function in a network.

3. Gateway Network Element

A gateway network element is a network element directly connected to the DCN or a network element directly connected to the network management, provides a data forwarding function, and functions as an intermediate forwarding network element for communication between the network management and another network element. The network management can manage a remote network element by using the gateway network element.

It should be noted that, both the network element and the gateway network element may further include an input/output end, to facilitate communication between network elements and communication with the outside. In addition, the network element may further include a component that can be configured to implement another function. Details are not described herein.

4. Packet

A packet is a data unit exchanged and transmitted in the DCN, that is, a data block transmitted between sites or network elements. A specific format of the packet is not limited in this application. For example, the packet may also be referred to as a frame in a transmission process.

5. Payload Block

A payload block (PB) is located in a payload area of an ODU frame, and includes one byte or a plurality of consecutive bytes, or a plurality of consecutive bits. Details are as follows. A size of one payload block may be an integer multiple of a byte, or may be an integer multiple of 8 bytes, for example, 64 bytes, 128 bytes, 192 bytes, or 256 bytes. Optionally, sizes of different payload blocks are equal, and specific examples in the following are all described by using this as an example. The payload block may also be referred to as a code block or another name. This is not limited in this application.

It should be noted that, during a specific implementation, one payload block is a minimum unit (which may also be referred to as a minimum tributary unit) that carries service data. A plurality of payload blocks may be combined to form a flexible tributary unit, and are configured to carry service data of a corresponding rate.

For ease of understanding embodiments of this application, a communication system applicable to embodiments of this application is first described in detail with reference to FIG. 1.

FIG. 1 is a schematic diagram of an architecture of a system according to an embodiment of this application. It should be understood that the architecture of the system shown in FIG. 1 is merely an example for ease of understanding, and should not constitute a limitation on the scope to which this application is applicable.

As shown in FIG. 1, the system includes a control device 10 and a communication network 20. The communication network 20 may include a network element A, a network element B, a network element C, and a network element D. A DCN service can be run on each network element. The network element A is a gateway network element, is directly connected to the control device 10, and is configured to receive control information sent by the control device 10, and then run the control information locally in the network element A, or forward the control information to the network element B. The network element B needs to communicate with the control device 10 by using the network element A. The network element C needs to communicate with the control device 10 by using the network element A and the network element B. The network element D needs to communicate with the control device 10 by using the network elements A, B, and C. For example, when the control device 10 delivers the control information to the network element D, the control device 10 first delivers the control information to the gateway network element A. The control information is sequentially forwarded by the gateway network element A, the network element B, and the network element C, and finally reaches the network element D.

Because the network elements B, C, and D cannot directly communicate with the control device 10, management and control performed by the control device 10 on the network elements B, C, and D may be referred to as remote management.

Figure 2:
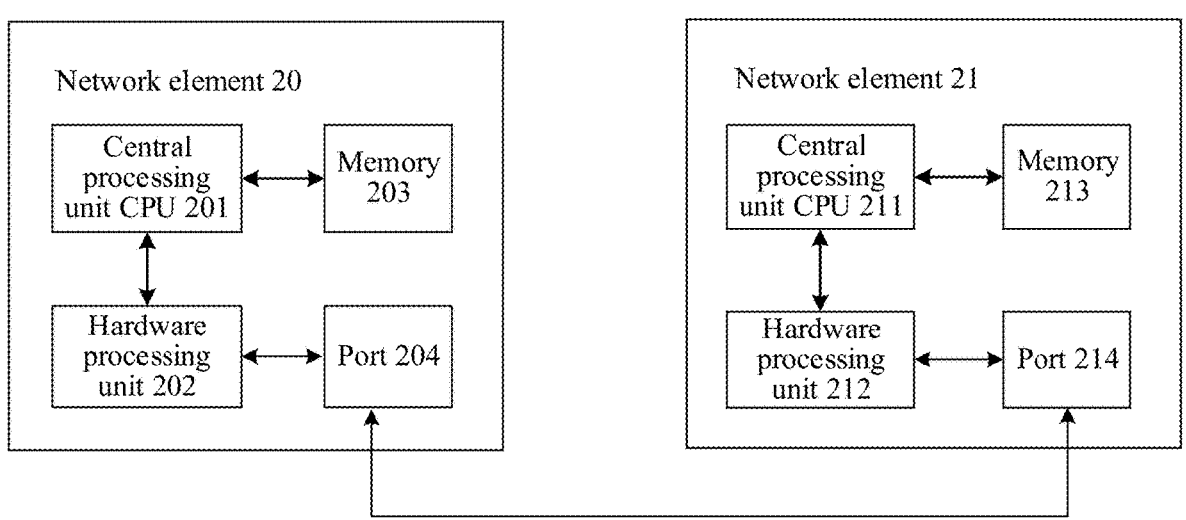
FIG. 2 is a schematic diagram of a structure of communication between any two network elements in FIG. 1 according to an embodiment of this application.

FIG. 2 is a schematic diagram of a structure of communication between any two network elements in FIG. 1 according to an embodiment of this application. As shown in FIG. 2, a network element 20 includes a central processing unit CPU 201, a hardware processing unit 202, a memory 203, and a port 204, which are connected to each other through an internal bus of the network element 20. A network element 21 includes a central processing unit CPU 211, a hardware processing unit 212, a memory 213, and a port 214, which are similarly connected to each other through an internal bus of the network element 21. The port 204 and the port 214 are connected through a DCN, to implement communication between the network element 20 and the network element 21. It should be noted that, FIG. 2 shows only an example of a structure and composition of a network element. In a specific implementation, the network element 20 and the network element 21 may further include other components, such as a power supply, a fan, and a driver. Other components and structures that are further included in the network element 20 and the network element 21 in the specific implementation are not limited in this embodiment of the present invention.

It should be noted that, the hardware processing unit in this application is a general name of various physical apparatuses that include electronic elements, mechanical elements, or optoelectronic elements and have a packet processing capability in addition to a CPU, for example, a processing board, an interface board, a line board, a tributary board, and a cross-connect board. In a specific implementation, the foregoing hardware processing unit may be integrated into one chip by using a bus, for example, an FPGA chip. The FPGA chip may be connected to a CPU through an interface or a bus, to implement communication between the FPGA chip and the CPU. For example, the FPGA chip is configured to extract a DCN packet from a port of a network element or a network device.

It should be understood that, in the network element 20, the CPU 201 needs to be connected to all boards in the device. When any board is faulty, alarm information is reported to the CPU 201 through an alarm register. The CPU 201 queries the alarm register and reads the alarm information to determine whether to perform service switch over. If the CPU 201 determines to perform service switch over, a switch over configuration needs to be performed. Therefore, the CPU 201 needs to process a large quantity of alarm information at any time. Such periodic operation has a high requirement on performance of the CPU.

Currently, after receiving a DCN packet from a network management side, each network element needs to extract all control information and send the information to the CPU. The CPU identifies, based on an ID in a packet header, whether the control information belongs to the network element. If the control information belongs to the network element, the CPU delivers the control information to an application layer for processing. If the control information does not belong to the network element, the CPU searches a routing table and inserts a packet including the control information to a service board, and then the packet is forwarded to a next hop. For example, the network element 20 receives, through the port 204, a packet sent by the control device, where the packet includes control information for the network element. Then, the hardware processing unit 202 obtains the control information, and reports the control information to the CPU 201 for analysis and processing. The CPU 201 determines, based on ID information of the control information, whether the control information belongs to the current network element 20. If the control information belongs to the network element 20, the CPU 201 delivers the control information to the application layer for processing. Alternatively, if the control information does not belong to the network element 20, the CPU 201 re-encapsulates the control information into a packet and inserts the packet to the service board, and the packet is forwarded to the downstream network element 21 along with a service.

However, in the current DCN, for each network element, only a few packets need to be processed locally, and most packets pass through directly. FIG. 1 is used as an example. It is assumed that the control device 10 sends 10 MB control information to the network elements A, B, C, and D separately. In this case, a hardware processing unit of the network element A needs to send all 40 MB information to a local CPU, and the local CPU determines that 10 MB control information in the information needs to be processed by the network element A, and other 30 MB control information is forwarded to the network element B. The network elements B and C perform a same processing process. It can be learned that the CPUs of the network elements A, B, and C all process a large quantity of packets that do not belong to the local network elements.

Therefore, in the foregoing processing manner in which the hardware processing unit reports all control information to the CPU, in one aspect, a packet processing delay is long and processing efficiency is low, in another aspect, CPU reading resources are greatly consumed, and when a board batch alarm occurs, a switch over configuration capability may be insufficient. In severe cases, the CPU may undergo a warm reset. As a result, the query and configuration cannot be performed.

In addition, currently, insufficient available bandwidth of the DCN packet is also an urgent problem to be resolved.

Figure 3:
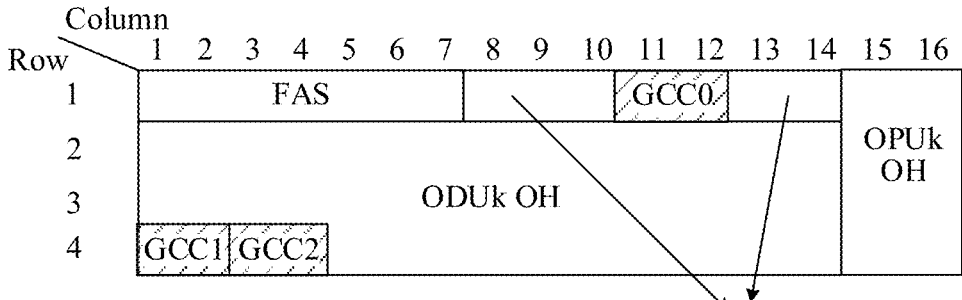
FIG. 3 is a schematic diagram of a structure of OTUk overheads according to an embodiment of this application.

FIG. 3 is a schematic diagram of a structure of OTUk frame overheads. As shown in FIG. 3, the OTUk frame overheads occupy 4 rows*16 columns in total. Columns 1 to 7 in row 1 are a frame alignment signal (FAS) and a multiframe alignment signal (MFAS); columns 8 to 14 in row 1 are optical transport unit-k (OTUk) overheads; columns 1 to 14 in rows 2 to 4 are optical data unit-k (ODUk) overheads; and columns 15 and 16 in rows 1 to 4 are optical channel payload unit k (OPUk) overheads. Details are as follows. GCC fields (GCC0, GCC1, and GCC2) in the overheads are used to transmit control information between network elements. It can be learned that a bandwidth currently used to transmit the control information is small, and a specific value of the bandwidth is directly related to a rate level of the ODUk. For example, when the rate level k is equal to 0, a corresponding bit rate of an ODU0 is 1.25 Gbit/s. In this case, a bandwidth of each field (one column in each row) of an ODU0 frame is 0.32 Mbit/s, and a total bandwidth of the GCC fields that can be used to transmit the control information is less than 1 Mbit/s. For another example, when the rate level k is equal to 1, a corresponding bit rate of an ODU1 is 2.5 Gbit/s. In this case, a bandwidth of each field of an ODU1 frame is 0.64 M, and a total bandwidth of the GCC fields is less than 2 Mbit/s.

In conclusion, emergence of requirements such as centralized management and control, ultra-large network management, and large-scale service provisioning impose increasingly high requirements on the bandwidth of the DCN packet. The available bandwidth of the current DCN cannot meet increasing service requirements. In addition, when a single network element processes the DCN packet, CPU reading resources are greatly consumed. This leads to degradation of a CPU processing capability. These problems restrict an improvement of a network communication capability.

Based on the foregoing problem, embodiments of this application provide a packet processing method, device, and system for improving CPU processing performance.

Figure 4:
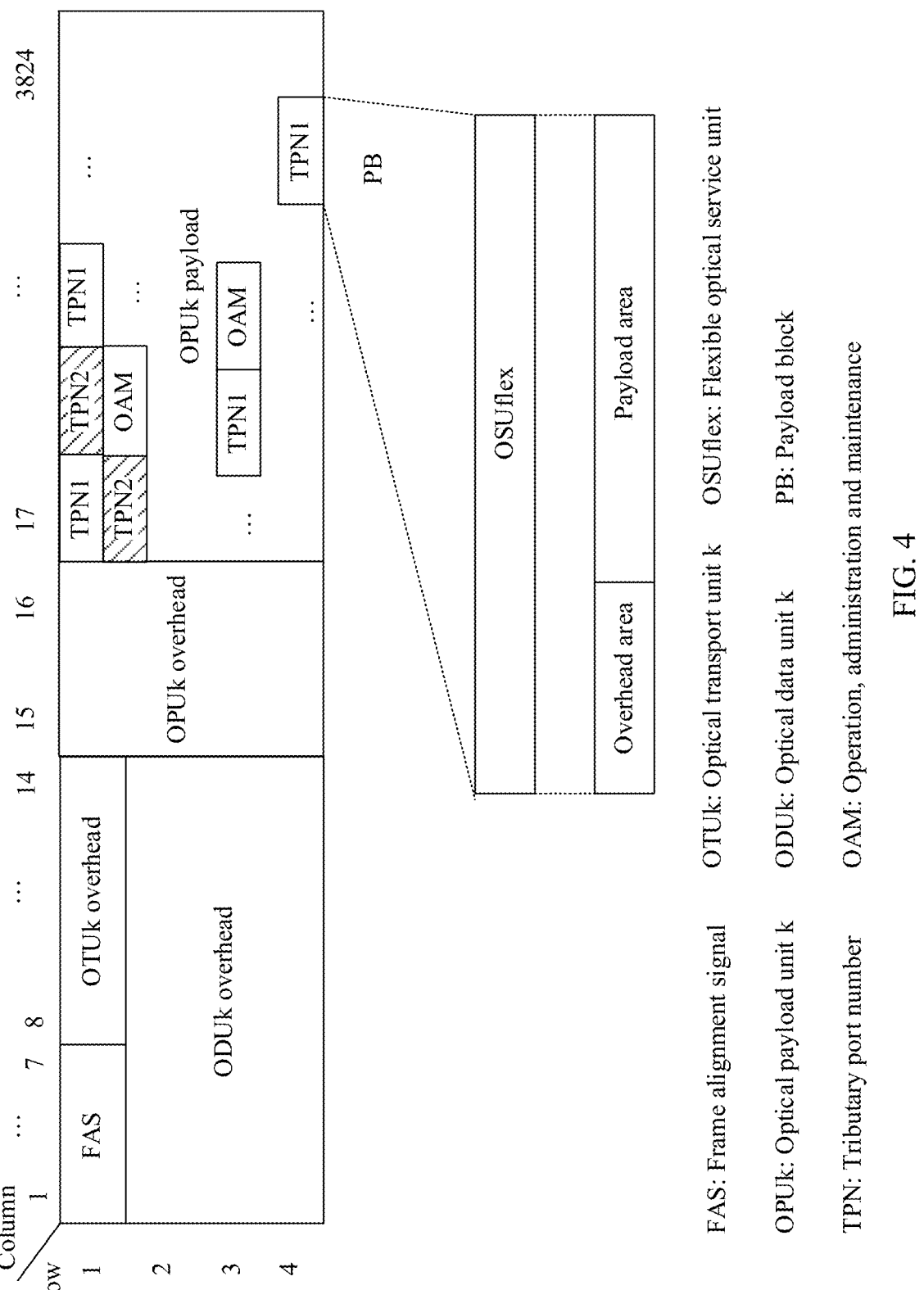
FIG. 4 is a schematic diagram of a location of a DCN packet in an OTUk frame according to an embodiment of this application.

FIG. 4 is a schematic diagram of a location of a DCN packet in an OTUk frame according to an embodiment of this application. As shown in FIG. 4, a payload area of an OPUk or an OPUflex is divided into a plurality of payload blocks PB s, and each payload block is an independent information element, which is referred to as a flexible optical service unit (OSUflex) in this application. The OSUflex changes an original data encapsulation size and can be directly mapped to an ODUk pipe. In this way, a fine-granularity signal can be efficiently carried by using a flexible pipe bandwidth definition.

It should be noted that, the OSUflex may also be referred to as an OSU frame or a flexible frame. This is not limited in this application. It should also be noted that, a length of the OSU frame is usually a fixed size, for example, the length is 192 bytes, 240 bytes, 128 bytes, 64 bytes, or the like.

In this embodiment of this application, based on a type of carried data, the plurality of payload blocks may be classified into a payload block used to carry service data and a payload block used to carry control information (for example, an OAM payload block). Each payload block includes a tributary port number (TPN), which is used as a unique channel identifier of the OSU in a transmission process. For example, a payload block with a TPN1 identifier is used to carry a first service; and a payload block with a TPN2 identifier is used to carry a second service. In addition, the OAM payload block also has a corresponding TPN. For details, refer to FIG. 5.

Figure 5:
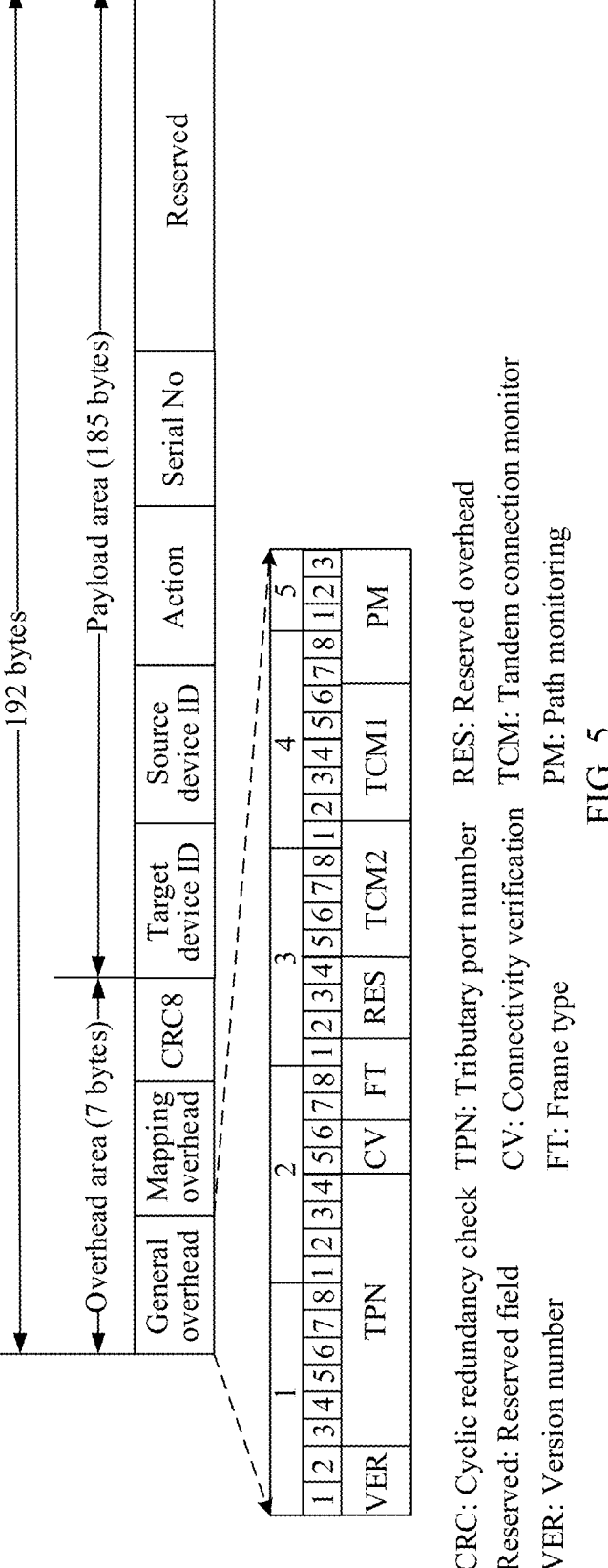
FIG. 5 is a schematic diagram of a structure of an OSU frame according to an embodiment of this application.

FIG. 5 is a schematic diagram of a structure of an OSU frame according to an embodiment of this application. As shown in FIG. 5, the OSU frame includes two parts: an overhead area and a payload area. In an example, a length of the OSU frame is 192 bytes, where bytes 1 to 7 are in the overhead area, and bytes 8 to 192 are in the payload area. The overhead area includes three parts: a general overhead, a mapping overhead, and a CRC8 check area. Further, the general overhead includes a version number VER, a TPN, a connectivity verification (CV), a frame type (FT), a tandem connection monitor (TCM), a path monitoring (PM), and a reserved overhead RES. In this application, a new frame type is defined by using an FT field. For example, FT=111 is set to indicate that a frame type of a current OSU frame is a control frame and is used to carry an OAM signal. In addition, the mapping overhead may indicate a mapping manner or a specific location of data in the payload area. Details are not described herein.

The payload area of the OSU frame includes a target device ID, which indicates a target network device of a DCN packet, and is used by an intermediate forwarding device to determine, based on the target device ID, whether the DCN packet is a direct packet. In addition, the payload area may further include fields such as a source device ID, operation content, and an operation sequence number of the DCN packet. The source device ID indicates a sending device of the DCN packet. After performing the operation content, the target device may carry the source device ID when feeding back response information to the source device. The operation content indicates a performance action or configuration content of the target device. When the source device needs to send a plurality of times of continuous operation content to the target device, the operation sequence number is used to identify a sequence of the plurality of times of continuous operation content.

For example, the DCN packet is used to perform basic operation, maintenance, and management on the network element, for example, configuration delivery, performance alarm, software upgrade, log query, database deletion, and file deletion. The operation content in the DCN packet is a specific operation command symbol corresponding to the foregoing control and management packet. For example, the first DCN packet is used for a packet sending and receiving test, and the operation content is a command symbol for confirming, to a second network device, whether a port of the second network device can receive a command symbol of the packet. It should be understood that there is a specific correspondence between the operation command symbol and specific control management content. The specific correspondence may be agreed upon according to a protocol, and is preconfigured in the network device.

It should be understood that a current data communication network may include a plurality of transport networks or a plurality of networking manners. In a scenario in which a communication network is in a transition, an upgrade, or a hybrid network, the DCN packet may have different encapsulation formats. For example, the DCN packet may further have an encapsulation format shown in FIG. 6.

FIG. 6 is a schematic diagram of an encapsulation format of a DCN packet according to an embodiment of this application. As shown in FIG. 6, the DCN packet includes a target media access control (MAC) address, a source MAC address, a packet type, a target device ID, a source device ID, operation content Action, an operation sequence number Serial No, and the like. The target MAC address mainly indicates an address of a network device that receives the DCN packet, the source MAC address mainly indicates an address of a network device that sends the DCN packet, and the packet type indicates that the DCN packet is a control packet. In an example, in an OTN, the foregoing DCN packet is encapsulated in a payload area of an OSU frame. It should be noted that, the OSU frame shown in FIG. 5 may carry a plurality of DCN packets with different target device IDs.

The following describes a packet processing method in this application in an interaction perspective.

Figure 7:
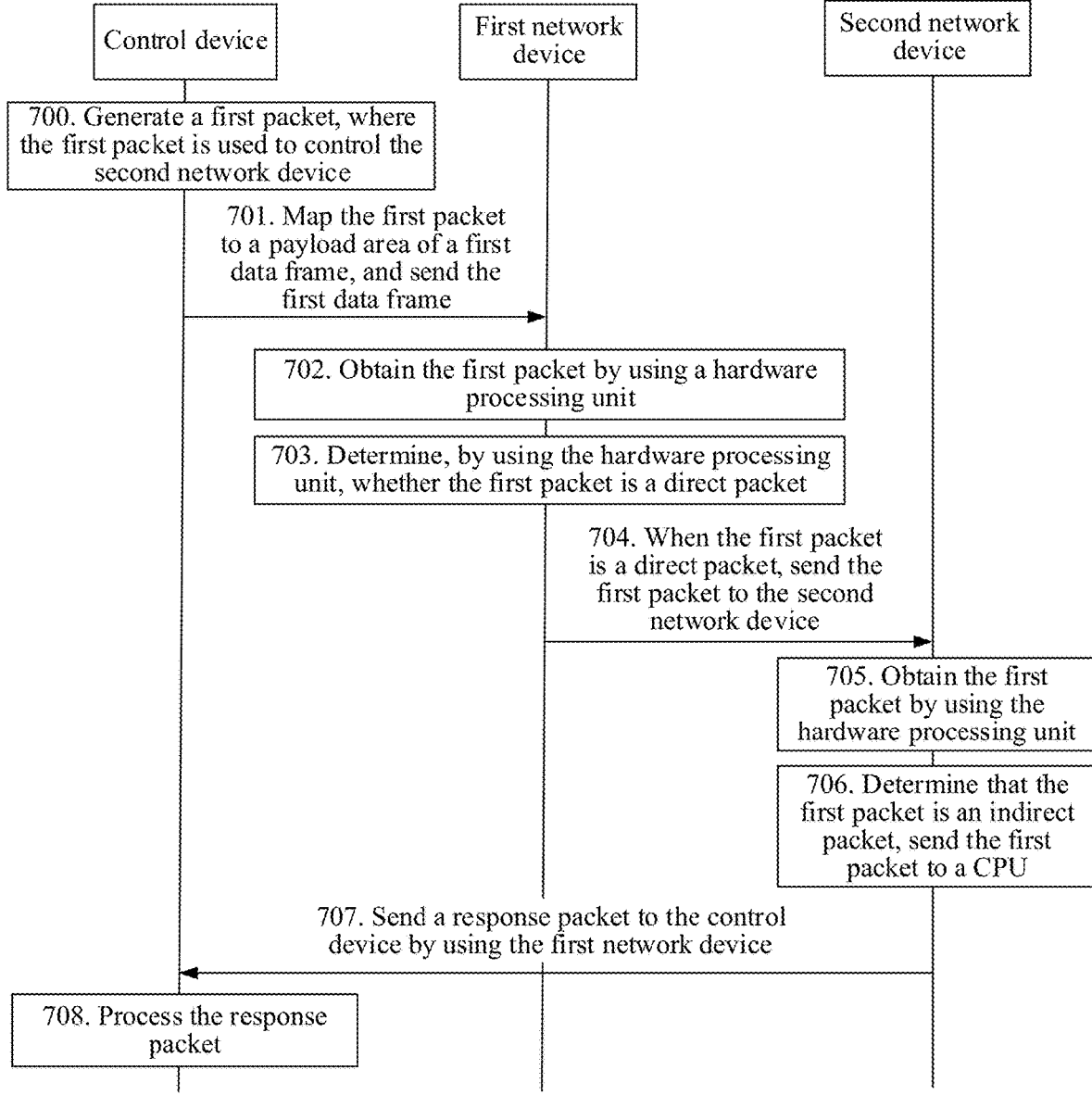
FIG. 7 is a flowchart of a packet processing method according to an embodiment of this application.

FIG. 7 is a flowchart of a packet processing method according to an embodiment of this application. The method may be applied to the communication system shown in FIG. 1. As shown in FIG. 7, the method includes the following steps.

S700. A control device generates a first DCN packet.

The first DCN packet is used to control a second network device, the first DCN packet includes a target device identifier, and the second network device corresponds to the target device identifier. For example, the control device is the control device 10 in FIG. 1, a first network device is the network element A, and the second network device is the network element B.

It may be understood that, in a network, each network device has a corresponding device identifier, for example, a device MAC address or a device ID. Any network device may record a MAC address or a device ID corresponding to each network device in a current network in a local forwarding relationship table in advance. In this way, when any network device obtains the target device MAC address or the target device ID in the DCN packet by parsing, a corresponding target network device may be determined based on the preset forwarding relationship table. In this embodiment, the second network device corresponds to the target device identifier. Therefore, it may be understood that the target device identifier indicates the second network device, and any network device may determine, based on the target device identifier, that a target device of the first DCN packet is the second network device.

S701. The control device maps the first DCN packet to a payload area of a first data frame, and sends the first data frame to the first network device.

In this embodiment, the control device may be understood as a network management device, for example, an intelligent network management device, that is, a network cloud engine (NCE).

In an implementation, the foregoing network management device may be deployed on one physical device. The physical device may include one or more processors and one or more memories. The memory may store instructions, and when the instructions are loaded and executed by the processor, a function performed by the foregoing network management device may be implemented. Certainly, the physical device may further include an input/output interface, for example, a wired or wireless network interface, to communicate with outside. The physical device may further include a component that can be configured to implement another function. Details are not described herein.

For example, the network management device may be: a centralized network element, a centralized control unit, an auto control center (ACC), or the like. For example, the control device is the control device 10 in FIG. 1.

In another implementation, the foregoing network management device may alternatively be deployed on a plurality of physical devices in a distributed manner. The plurality of physical devices may form a device cluster. The device cluster may include one or more processors and one or more memories. The memory may store instructions, and when the instructions are loaded and executed by the processor, the function performed by the foregoing network management device may be implemented. For example, the control device is one or more controllers deployed inside the first network device. A format of the first DCN packet may be shown in FIG. 5. The control device maps the first DCN packet to the payload area of the first data frame. It may be understood that the control device maps the first DCN packet to the OAM payload block shown in FIG. 4. For example, the control device maps the first DCN packet to one or more OAM payload blocks.

S702. The first network device obtains the first DCN packet by using a hardware processing unit.

In this embodiment, the first DCN packet is carried in the payload area of the first data frame. That the first network device obtains the first DCN packet by using a hardware processing unit may include: The first network device demaps the first data frame by using the hardware processing unit, and then obtains the first DCN packet from the payload area of the first data frame.

In an example, the first network device is the network element A in FIG. 2. For example, the first DCN packet has the frame structure shown in FIG. 5.

In an example, the first data frame may be an OTU frame. A payload area of the OTU frame includes a plurality of OSU frames. The first DCN packet is carried in at least one of the OSU frames.

S703. The first network device determines, by using the hardware processing unit, whether the first DCN packet is a direct packet.

In this embodiment, a direct packet is a packet for which a current network element is only responsible for transmitting packet content from a source network device to a target network device and does not need to respond to the packet content. Correspondingly, an indirect packet is a packet for which the current network element, as the target network device, needs to respond to the packet content. The current network element needs to respond to the packet content. It may be understood as that the current network element needs to perform a corresponding configuration based on the packet content, and then responds to the source network device after the configuration is completed.

For example, the first network device determines, based on the target device identifier, by using the hardware processing unit, whether the first DCN packet is a direct packet. When the target device identifier does not match the first network device, the hardware processing unit determines that the first DCN packet is a direct packet. When the target device identifier matches the first network device, the hardware processing unit determines that the first DCN packet is an indirect packet. Details are as follows. The first network device determines, based on the target device MAC address, whether the first DCN packet is a direct packet, or the first network device determines, based on the target device ID, whether the first DCN packet is a direct packet.

For example, the hardware processing unit includes an FPGA. Alternatively, the hardware processing unit includes an application specific integrated circuit (ASIC), or the hardware processing unit includes a digital signal processor (DSP).

In this embodiment, the first network device directly determines, by bypassing a CPU, whether the first DCN packet is a direct packet by using the hardware processing unit. The CPU does not need to perform processing. Therefore, resource consumption of the CPU can be reduced, and processing performance of the CPU can be improved.

S704. When the first DCN packet is a direct packet, the first network device sends the first DCN packet to the second network device, where the second network device corresponds to the target device identifier.

In this embodiment, when the first network device determines, by using the hardware processing unit, that the first DCN packet is a direct packet, the first network device remaps the first DCN packet to a payload area of a second data frame by using the hardware processing unit, and then sends the second data frame through a port of the first network device. For example, the second data frame is an OTU frame. A payload area of the OTU frame includes a plurality of OSU frames. The first DCN packet is carried in at least one of the OSU frames.

In this embodiment, the target device identifier may be a MAC address or a device ID of the second network device. The second network device corresponds to the target device identifier. It may be understood that the target device identifier indicates the second network device, and any network device may determine, based on the target device identifier, that the target device of the first DCN packet is the second network device.

For example, the first network device queries, by using the hardware processing unit in the forwarding relationship table for a network device corresponding to the target device identifier. Based on the forwarding relationship table, the hardware processing unit may accurately find the second network device corresponding to the target device identifier, to avoid incorrect forwarding of the first DCN packet. The forwarding relationship table may be preconfigured in the hardware processing unit. For example, the CPU in the first network device may periodically deliver or update the forwarding relationship table to a service board, and the service board may perform service layer fast forwarding on a received direct packet based on the configured forwarding relationship table.

In addition, a cross-connection relationship of the service board of the first network device may be preconfigured. For example, a connection is established between every two of a plurality of slots of a cross-connect board in advance, and the hardware processing unit of the first network device sends the first DCN packet to a corresponding slot based on the forwarding relationship table, to forward the first DCN packet to the second network device.

It should be understood that the method may further include: When the first DCN packet is an indirect packet, the first network device sends the first DCN packet to the CPU. When the first network device determines, by using the hardware processing unit, that the first DCN packet is an indirect packet, the hardware processing unit sends the first DCN packet to the CPU for processing. In this case, the first network device corresponds to the target device identifier.

It should also be noted that, alternatively, one or more intermediate forwarding devices may exist between the first network device and the second network device. The first network device may first send the first DCN packet to a downstream network device of the first network device, and then the first DCN packet is sent to the second network device after being forwarded by the downstream network device. It should be understood that a packet forwarding manner described in this embodiment is for the purpose of brief and convenient description, and does not constitute a limitation on a solution.

S705. The second network device obtains the first DCN packet by using the hardware processing unit.

The first DCN packet is carried in the payload area of the second data frame, and the first DCN packet includes the target device identifier. The second network device receives the second data frame sent by the first network device, and obtains the first DCN packet from the second data frame. The target device identifier indicates a target receiving device of the first DCN packet. For example, the target device identifier may be the target device ID, or the target device identifier may be the target device MAC address.

In an example, the second network device is the network element B in FIG. 2, and the network element B obtains the first DCN packet from the OTU frame through the service board. For example, the first DCN packet has the frame structure shown in FIG. 5.

In an example, the payload area of the second data frame includes the plurality of OSU frames. The first DCN packet is carried in at least one of the OSU frames in a distributed and regular manner.

S706. The second network device determines, by using the hardware processing unit, that the first DCN packet is an indirect packet, and sends the first DCN packet to a CPU of the second network device.

Details are as follows. The hardware processing unit of the second network device corresponds to the second network device by using the target device identifier of the first DCN packet, and determines that the first DCN packet is an indirect packet. Then, the hardware processing unit sends the first DCN packet to the CPU through an internal bus, and the CPU specifically executes a command field in the first DCN packet. For example, the CPU executes the Action field shown in FIG. 6.

S707. The second network device sends a response packet to the control device by using the first network device.

The CPU of the second network device generates the response packet after completing execution. Details are as follows. The response packet includes a source device ID or MAC address in the first DCN packet, which indicates that the response packet is sent to the control device.

S708. The control device processes the response packet.

For example, the control device receives and identifies the response packet, and determines that execution of the first DCN packet is completed.

For example, the response packet includes an operation sequence number, and the control device determines, by identifying the operation sequence number, that the second network device has completed operation content corresponding to the operation sequence number.

In conclusion, according to the packet processing method provided in this embodiment, after receiving a large quantity of DCN packets, a single network element determines, by using the hardware processing unit, whether the DCN packets are direct packets, and quickly forwards, by using a lower-layer service board, a direct packet that does not need to be processed by the current network element, and reports only an indirect packet that needs to be processed by the current network element to the CPU. This can greatly reduce read power consumption of the CPU, thereby improving processing performance of the CPU. In addition, the DCN packet between network elements is carried in a payload area of an OTU frame, which expands a transmission bandwidth of the DCN packet and resolves a problem of insufficient bandwidth of a current control channel.

FIG. 8 is a flowchart of another packet processing method according to an embodiment of this application. As shown in FIG. 8, the method includes the following steps.

S801. A first network device obtains a first DCN packet by using a hardware processing unit, where the first DCN packet is carried in a payload area of a first data frame, and the first DCN packet includes a target device identifier.

The first network device in this embodiment of this application may be specifically the network element A, the network element B, or the network element C in FIG. 1.

Compared with carrying the DCN packet by using GCC fields in an overhead area of an OTU frame, a payload area of the OTU frame is flexibly re-divided in this application. As shown in FIG. 5, each payload block may serve as an independent packet carrying unit, that is, an OSU frame, and has an independent overhead area and payload area. The overhead area may include an FT field, used to identify that a type of the OSU frame is a control frame, to distinguish between another service frame that carries service data. A size of each OSU frame may be customized. Each OSU frame has a same size, which facilitates monitoring and management. For example, a length of each OSU frame is 192 bytes. The first DCN packet may be mapped to a plurality of OSU frames.

S802. The first network device determines, by using the hardware processing unit, whether the first DCN packet is a direct packet.

The hardware processing unit has a specific logical operation processing capability. For example, the hardware processing unit obtains the target device identifier of the first DCN packet, and compares the target device identifier with a first network device identifier. If identifying that the target device identifier does not correspond to the first network device identifier, the hardware processing unit determines that the first DCN packet is a direct packet.

S803. When the first DCN packet is a direct packet, the first network device sends the first DCN packet to a second network device, where the second network device corresponds to the target device identifier.

The method in this embodiment further includes: When the first DCN packet is an indirect packet, the first network device sends, by using the hardware processing unit, the first DCN packet to a CPU for processing.

For specific implementations of method steps S801 to S803 in this embodiment, refer to the foregoing steps S702 to S704, and details are not described herein again.

In conclusion, the hardware processing unit of the first network device obtains the first DCN packet, and when the first network device is not a target device of the first DCN packet, directly forwards the first DCN packet at a hardware layer. The hardware processing unit sends the first DCN packet to the CPU for processing only when the first network device is the target device of the first DCN packet. Compared with that all received DCN packets are uniformly sent to a CPU of a device for analysis, and then are delivered to a hardware processing unit to pass through along with a service, the solution provided in this embodiment can effectively save read and calculation resources of the CPU, thereby improving performance of the CPU.

In addition, as types of services carried by a current OTN become more and more complex, a quantity of alarm information that needs to be collected by a system in a unit time increases in a multiplying manner. In a conventional alarm information collection method, a CPU is used to obtain alarm information by reading application-specific integrated circuits (ASICs) one by one or an alarm register that is in an FPGA and that is configured to carry various service alarms. If the CPU determines that the service alarms are generated, the CPU needs to perform a corresponding operation, for example, a service switch over configuration. Therefore, the CPU needs to process a large quantity of alarm information in a unit time. Such periodic operation has a high requirement on performance of the CPU.

To further reduce consumption of CPU processing resources and improve processing performance of the CPU, this application further provides an alarm information collection method.

FIG. 9 is a flowchart of an alarm information collection method within a network element according to an embodiment of this application. As shown in FIG. 9, the method includes the following steps.

S901. A CPU sends a second DCN packet to a hardware processing unit, where the second DCN packet includes an address of at least one alarm register.

In this embodiment, the second DCN packet indicates the hardware processing unit to collect alarm information from the at least one alarm register. For example, the second DCN packet includes the address of the at least one alarm register. In addition, the second DCN packet may further include a collection mode, a collection periodicity, and a total quantity of alarm registers. The collection mode may include a manual mode and an automatic mode.

S902. The hardware processing unit periodically queries the at least one alarm register based on the second DCN packet.

For example, the hardware processing unit accesses the at least one alarm register in a specific collection mode and a specific collection periodicity based on the address of the at least one alarm register. The hardware processing unit obtains the specific collection mode and the specific collection periodicity from the second DCN packet. For example, the hardware processing unit may be an alarm collection unit.

FIG. 10 is a schematic diagram of a format of a packet transmitted within a network element according to an embodiment of this application. As shown in FIG. 10, a second DCN packet may include the following fields: a target MAC address, 6 bytes in total, used to identify an address of at least one alarm register; a source MAC address, 6 bytes in total, used to identify an address of a CPU; a frame type, 2 bytes in total, used to identify a control packet type; operation content, used to identify that a hardware processing unit needs to automatically query alarm information of the at least one alarm register based on a preset collection periodicity; and an operation sequence number, used to identify, when the hardware processing unit continuously collects the alarm information from a plurality of alarm registers, a sequence number of each operation.

For example, the hardware processing unit periodically reads a first alarm register based on a collection periodicity of 10 s based on the second DCN packet delivered by the CPU.

S903. When receiving the alarm information from the alarm register, the hardware processing unit reports the alarm information to the CPU.

According to the alarm information collection method within a network element provided in this embodiment, inside the network element, the CPU controls the hardware processing unit by using the second DCN packet, so that the hardware processing unit periodically reads the alarm register. In this way, an operation of querying an alarm is delivered to a hardware layer for completion, and collection of the alarm information can be completed without intervention of the CPU. This can save CPU resources and software overheads, and a released CPU resource can support a large quantity of actions with a strict time requirement, such as subnetwork connection protection (SNCP) switching of an OTN and automatic protection switching (APS) of an ETH.

It should be understood that the foregoing embodiment is merely an example. Within the network element, the CPU can also control another hardware processing unit by using a DCN packet, and an operation that originally needs to be performed by the CPU is completed at the hardware layer, for example, the automatic protection switching APS. This can reduce read and processing resource consumption of the CPU, thereby improving processing performance of the CPU.

The foregoing describes in detail the packet processing method provided in this application with reference to FIG. 4 to FIG. 10. The following describes in detail a packet processing device provided in embodiments of this application with reference to FIG. 11 to FIG. 14.

Figure 11:
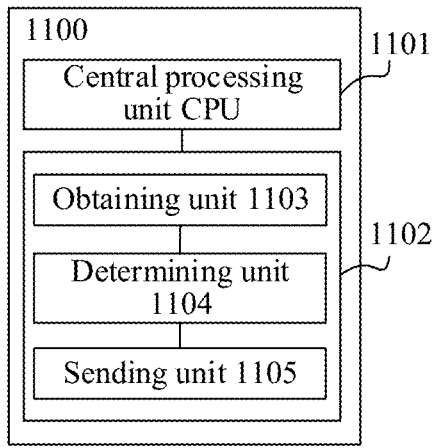
FIG. 11 is a schematic diagram of a structure of a packet processing network device according to an embodiment of this application.

FIG. 11 is a schematic diagram of a structure of a packet processing device according to an embodiment of this application. As shown in FIG. 11, a device 1100 includes a central processing unit CPU 1101 and a hardware processing unit 1102. The hardware processing unit 1102 further includes an obtaining unit 1103, a determining unit 1104, and a sending unit 1105.

The obtaining unit 1103 is configured to obtain a first DCN packet. The first DCN packet is a DCN packet, and is carried in a payload area of a first data frame, and the first DCN packet includes a target device identifier. The obtaining unit 1103 may be configured to perform steps S702, S705, and S801 in the foregoing method embodiments.

The determining unit 1104 is configured to determine whether the first DCN packet is a direct packet. Details are as follows. The determining unit 1104 determines, based on the target device identifier of the first DCN packet, whether the first DCN packet is a direct packet. The determining unit 1104 may be configured to perform steps S703, S706, and S802 in the foregoing method embodiments.

The sending unit 1105 is configured to: send, when the first DCN packet is a direct packet, the first DCN packet to a second network device, where the second network device corresponds to the target device identifier of the first DCN packet. The sending unit 1105 is further configured to: send, when the first DCN packet is an indirect packet, the first DCN packet to the CPU 1101. The sending unit 1105 may be configured to perform steps S704, S707, and S803 in the foregoing method embodiments.

The CPU 1101 is configured to: receive and process, when the first DCN packet is an indirect packet, the first DCN packet.

The device 1100 may further include a receiving unit, configured to receive a packet sent by another device or a board. The receiving unit may be configured to perform step S705 in the foregoing method embodiment. The sending unit 1105 and the receiving unit of the device 1100 may form a transceiver unit, and the transceiver unit has both receiving and sending functions. The obtaining unit 1103 and the determining unit 1104 may be at least one processor. The sending unit 1105 may be a transmitter or an interface circuit, and the receiving unit may be a receiver or an interface circuit. The receiver and the transmitter may be integrated to form a transceiver or an interface circuit.

Optionally, the device 1100 may further include a storage unit, configured to store data and/or signaling. The obtaining unit 1103, the determining unit 1104, or the sending unit 1105 may interact with or be coupled to the storage unit. For example, the obtaining unit 1103, the determining unit 1104, or the sending unit 1105 reads or invokes the data and/or signaling in the storage unit, so that the method in the foregoing embodiment is performed.

The foregoing units may exist independently, or may be all or partially integrated. For example, the obtaining unit 1103, the determining unit 1104, and the sending unit 1105 are integrated on one FPGA logic chip.

The device 1100 may specifically serve as a first network device, to perform an action performed by the first network device in FIG. 7 or the first network device in FIG. 8. Alternatively, the device 1100 may specifically serve as a second network device, to perform an action performed by the second network device in FIG. 7. For specific implementation details, refer to the foregoing method embodiments. Details are not described herein again.

Figure 12:
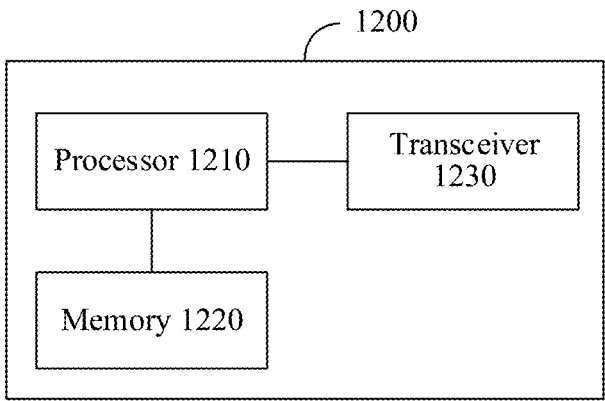
FIG. 12 is a schematic diagram of a structure of another packet processing network device according to an embodiment of this application.

FIG. 12 is a schematic diagram of a structure of another packet processing device according to an embodiment of this application. A device 1200 includes a processor 1210, and the processor 1210 is coupled to a memory 1220. The memory 1220 may be configured to store a computer program or instructions, and/or data. The processor 1210 is configured to execute the computer program or instructions and/or data stored in the memory 1220, so that the method in the foregoing method embodiment is performed.

The packet processing device 1200 further includes a transceiver 1230, configured to receive and/or send signaling.

Optionally, the device 1200 includes a plurality of processors 1210.

Optionally, the memory 1220 and the processor 1210 may be integrated together, or disposed separately.

Figure 13:
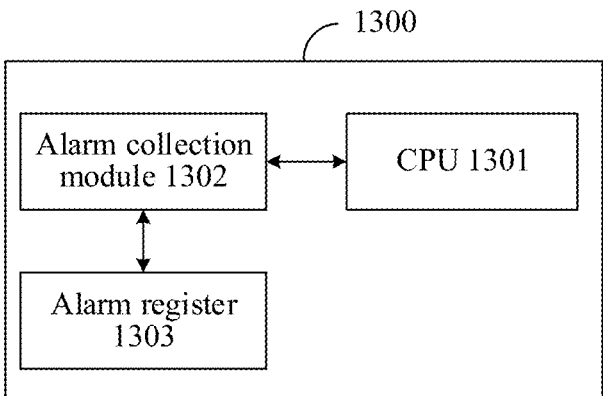
FIG. 13 is a schematic diagram of a structure of another alarm information collection device according to an embodiment of this application.

FIG. 13 is a schematic diagram of a structure of another network device according to an embodiment of this application. As shown in FIG. 13, the network device 1300 includes a CPU 1301, an alarm collection module 1302, and an alarm register 1303.

The CPU 1301 is configured to deliver configuration information to the alarm collection module 1302. The configuration information indicates the alarm collection module to collect alarm information from the alarm register. For example, the configuration information includes an address of at least one alarm register, a collection mode, a collection periodicity, and a total quantity of alarm registers. The collection mode may include a manual mode and an automatic mode. The CPU 1301 may be configured to perform step S901.

The alarm collection module 1302 is configured to periodically query the at least one alarm register based on the configuration information. The alarm collection module 1302 may be configured to perform steps S902 to S903.

The alarm register 1303 is configured to send feedback information to the alarm collection module. The alarm collection module 1302 is further configured to report the alarm information to the CPU 1301.

For specific implementation details of the network device 1300, refer to the foregoing method embodiments. Details are not described herein again.

When the device 1300 is a chip, the chip includes a transceiver unit and a processing unit. The transceiver unit may be an input/output circuit or a communication interface; and the processing unit may be a processor, a microprocessor, or an integrated circuit integrated on the chip.

Figure 14:
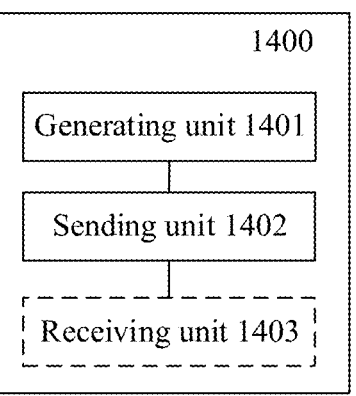
FIG. 14 is a schematic diagram of a structure of still another packet processing network device according to an embodiment of this application.

FIG. 14 is a schematic diagram of a structure of still another packet processing device according to an embodiment of this application. As shown in FIG. 14, a network device 1400 includes a generating unit 1401 and a sending unit 1402.

The generating unit 1401 is configured to generate a first DCN packet, where the first DCN packet is used to control a second network device, the first DCN packet includes a target device identifier, and the target device identifier corresponds to the second network device. The generating unit 1401 is specifically configured to perform the foregoing step S700.

The sending unit 1402 is configured to map the first DCN packet to a payload area of a first data frame, and send the first data frame to the first network device, so that the first network device forwards the first DCN packet to the second network device based on the target device identifier. The sending unit 1402 is specifically configured to perform the foregoing step S701.

In addition, the device 1400 may further include a receiving unit 1403, configured to receive response information from the second network device. The receiving unit may be configured to perform step S708 in the foregoing method embodiment. The sending unit 1402 and the receiving unit 1403 of the device 1400 may form a transceiver unit, and the transceiver unit has both receiving and sending functions. The sending unit 1402 may be a transmitter or an interface circuit, and the receiving unit 1403 may be a receiver or an interface circuit. The receiver and the transmitter may be integrated to form a transceiver or an interface circuit.

An embodiment of this application further provides a computer-readable storage medium. The computer-readable storage medium stores computer instructions used to implement the method performed by the control device or the method performed by the network element in the foregoing method embodiments.

For example, when the computer instructions are executed by a computer, the computer implements the method performed by the control device or the method performed by the network element in the foregoing method embodiments.

An embodiment of this application further provides a computer program product including instructions. When the instructions are executed by a computer, the computer implements the method performed by the control device or the method performed by the network element in the foregoing method embodiments.

An embodiment of this application further provides a commissioning system. The system includes the control device and the network element in the foregoing embodiments.

A processor in this embodiment of this application may be an integrated circuit chip, and has a signal processing capability. In an implementation process, the steps in the foregoing method embodiments may be completed by using an integrated logic circuit of hardware or instructions in a form of software in the processor. The foregoing processor may be a central processing unit CPU, or the processor may be another general purpose processor, a digital signal processor DSP, an application specific integrated circuit ASIC, a field programmable gate array FPGA or another programmable logic device, a discrete gate or transistor logic device, or a discrete hardware component. The foregoing processor may implement or perform the methods, steps, and logical block diagrams disclosed in embodiments of this application. The steps of the methods disclosed with reference to embodiments of this application may be directly performed and completed by using a hardware decoding processor, or may be performed and completed by using a combination of hardware and software module in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be further understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which serves as an external cache. Through example but not limitative description, many forms of RAMS may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memories of the systems and methods described herein are intended to include, but are not limited to, these and any other suitable types of memories.

An apparatus completely corresponds to the network device in the method embodiment, and a corresponding module performs a corresponding step. For example, a sending module or a transmitter performs a sending step in the method embodiment, a receiving module or a receiver performs a receiving step in the method embodiment, and other steps except sending and receiving may be performed by a processing module or a processor. For a specific function of the module, refer to a corresponding method embodiment, and details are not described again.

In an implementation process, the steps in the foregoing methods may be completed by using an integrated logic circuit of hardware or instructions in a form of software in the processor. The steps of the methods disclosed with reference to embodiments of this application may be directly performed and completed by a hardware processor, or may be performed and completed by using a combination of hardware and software module in the processor. A software module may be located in a mature storage medium in the art, such as a random access memory, a flash memory, a read-only memory, a programmable read-only memory, an electrically erasable programmable memory, a register, or the like. Details are not described herein again.

It should be understood that sequence numbers of the foregoing processes do not mean performance sequences in various embodiments of this application. The performance sequences of the processes should be determined based on a function and internal logic of the processes, and should not be construed as any limitation on the implementation processes of embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data communication network (DCN) packet processing method, comprising:

obtaining, by a first network device, a first DCN packet by using a hardware processor, wherein the first DCN packet is carried in a payload area of a first data frame, and the first DCN packet comprises a target device identifier;

determining, based on the target device identifier, by the first network device by using the hardware processor, whether the first DCN packet is a direct packet;

in response to determining that the first DCN packet is a direct packet, sending, by the first network device, the first DCN packet to a second network device, wherein the second network device corresponds to the target device identifier;

sending a second DCN packet to the hardware processor, wherein the second DCN packet comprises an address of at least one alarm register;

querying the at least one alarm register based on the second DCN packet; and in response to receiving alarm information from the at least one alarm register, sending the alarm information.

2. The method according to claim 1, wherein the target device identifier comprises a target device MAC address or a target device ID, and the determining, based on the target device identifier, by the first network device by using the hardware processor, whether the first DCN packet is a direct packet comprises:

determining, by the hardware processor of the first network device based on the target device MAC address or the target device ID, whether the first DCN packet is a direct packet.

3. The method according to claim 1, wherein the first DCN packet further comprises at least one of the following: a source device MAC address, a control packet identifier, a source device ID, operation content, or an operation sequence number.

4. The method according to claim 1, wherein the first data frame is an optical transport unit (OTU) frame, a payload area of the OTU frame comprises a plurality of optical service unit (OSU) frames, and the first DCN packet is carried in at least one of the OSU frames.

5. The method according to claim 4, wherein a length of the OSU frame is 192 bytes, 240 bytes, 128 bytes, or 64 bytes.

6. The method according to claim 1, wherein the determining, by using the hardware processor, whether the first DCN packet is a direct packet further comprises:

in response to determining that the first DCN packet is an indirect packet, sending, by the hardware processor, the first DCN packet to a central processing unit (CPU) of the first network device.

7. The method according to claim 1, wherein sending the second DCN packet to the hardware processor comprises sending, by a CPU of the first network device, the second DCN packet to the hardware processor;

querying the at least one alarm register based on the second DCN packet comprises periodically querying, by the hardware processor, the at least one alarm register based on the second DCN packet; and sending the alarm information comprises sending, by the hardware processor, the alarm information to the CPU.

8. The method according to claim 1, wherein the sending, by the first network device, the first DCN packet to a second network device comprises:

mapping, by the first network device, the first DCN packet to a payload area of a second data frame, wherein the second data frame is an OTU frame, a payload area of the OTU frame comprises a plurality of optical service unit (OSU) frames, and the first DCN packet is carried in at least one of the OSU frames; and sending, by the first network device, the second data frame to the second network device.

9. A data communication network (DCN) packet processing method, comprising:

generating, by a control device, a first DCN packet, wherein the first DCN packet comprises a target device identifier, and the target device identifier corresponds to a second network device;

mapping, by the control device, the first DCN packet to a payload area of a first data frame; and sending the first data frame to a first network device to enable the first network device to forward the first DCN packet to the second network device based on the target device identifier, wherein the first network device is configured to:

send a second DCN packet to a hardware processor, wherein the second DCN packet comprises an address of at least one alarm register;

query the at least one alarm register based on the second DCN packet; and in response to receiving alarm information from the at least one alarm register, send the alarm information.

10. The method according to claim 9, wherein the first data frame is an optical transport unit (OTU) frame, a payload area of the OTU frame comprises a plurality of optical service unit (OSU) frames, and the first DCN packet is carried in at least one of the OSU frames.

11. The method according to claim 10, wherein a length of the OSU frame is 192 bytes, 240 bytes, 128 bytes, or 64 bytes.

12. A network device for data communication network (DCN) packet processing, comprising:

a hardware processor;

a transmitter; and one or more memories storing programming instructions for execution by the network device to:

obtain a first DCN packet, wherein the first DCN packet is carried in a payload area of a first data frame, and the first DCN packet comprises a target device identifier;

determine, based on the target device identifier, whether the first DCN packet is a direct packet;

in response to determining that the first DCN packet is a direct packet, send, by using the transmitter, the first DCN packet to a second network device, wherein the second network device corresponds to the target device identifier;

send a second DCN packet to the hardware processor, wherein the second DCN packet comprises an address of at least one alarm register;

query the at least one alarm register based on the second DCN packet; and in response to receiving alarm information from the at least one alarm register, send the alarm information.

13. The network device according to claim 12, wherein the target device identifier comprises a target device MAC address or a target device ID, and the programming instructions are for execution by the hardware processor to:

determine, based on the target device MAC address or the target device ID, whether the first DCN packet is a direct packet.

14. The network device according to claim 12, wherein the first data frame is an optical transport unit (OTU) frame, a payload area of the OTU frame comprises a plurality of optical service unit (OSU) frames, and the first DCN packet is carried in at least one of the OSU frames.

15. The network device according to claim 14, wherein a length of the OSU frame is 192 bytes, 240 bytes, 128 bytes, or 64 bytes.

16. The network device according to claim 12, wherein the network device further comprises a central processing unit (CPU), and the programming instructions are for execution by the hardware processor to:

in response to determining that the first DCN packet is an indirect packet, send, by using the transmitter, the first DCN packet to the CPU of the network device.

17. The network device according to claim 12, wherein the first DCN packet further comprises at least one of the following: a source device MAC address, a control packet identifier, a source device ID, operation content, or an operation sequence number.

18. The network device according to claim 12, wherein the network device further comprises an alarm collector and the at least one alarm register, and wherein:

sending the second DCN packet to the hardware processor comprises sending, by using a CPU of the network device, the second DCN packet to the alarm collector querying the at least one alarm register based on the second DCN packet comprises periodically querying, by using the alarm collector, the at least one alarm register based on the second DCN packet; and sending the alarm information comprises sending, by using the alarm collector, the alarm information to the CPU.

19. The network device according to claim 12, wherein the programming instructions are for execution by the hardware processor to:

map, by using the transmitter, the first DCN packet to a payload area of a second data frame, wherein the second data frame is an OTU frame, a payload area of the OTU frame comprises a plurality of optical service unit (OSU) frames, and the first DCN packet is carried in at least one of the OSU frames; and send, by using the transmitter, the second data frame to the second network device.

20. A system comprising a control device and a first network device, wherein the control device comprises:

a generator;

a transmitter;

at least one processor; and one or more memories coupled to the at least one processor and storing programming instructions for execution by the at least one processor to:

generate, by using the generator, a first data communication network (DCN) packet, wherein the first DCN packet is used to control a second network device, the first DCN packet comprises a target device identifier, and the target device identifier corresponds to the second network device;

map, by using the transmitter, the first DCN packet to a payload area of a first data frame; and send, by using the transmitter, the first data frame to the first network device, to enable the first network device to forward the first DCN packet to the second network device based on the target device identifier;

and wherein the first network device comprises:

a hardware processor; and one or more memories storing programming instructions for execution by the first network device to:

send a second DCN packet to the hardware processor, wherein the second DCN packet comprises an address of at least one alarm register;

query the at least one alarm register based on the second DCN packet; and in response to receiving alarm information from the at least one alarm register, send the alarm information.

* * * * *